(12) United States Patent
Pintos et al.

(10) Patent No.: US 8,502,677 B2
(45) Date of Patent: Aug. 6, 2013

(54) METHOD OF INTEGRATING AN IDENTIFICATION CIRCUIT INTO A DATA MEDIUM

(75) Inventors: Jean-Francois Pintos, Bourgbarre (FR); Philippe Minard, Saint Medard sur Ille (FR); Ali Louzir, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 781 days.

(21) Appl. No.: 12/308,724

(22) PCT Filed: Jun. 13, 2007

(86) PCT No.: PCT/FR2007/051431
§ 371 (c)(1),
(2), (4) Date: Jul. 22, 2009

(87) PCT Pub. No.: WO2008/000991
PCT Pub. Date: Jan. 3, 2008

(65) Prior Publication Data
US 2010/0045438 A1    Feb. 25, 2010

(30) Foreign Application Priority Data
Jun. 28, 2006  (FR) ...................... 06 05830

(51) Int. Cl.
*G08B 13/14*    (2006.01)
(52) U.S. Cl.
USPC ............... 340/572.7; 340/572.1; 343/767; 343/769; 343/770

(58) Field of Classification Search
USPC ............... 340/572.1, 572.5, 572.7; 343/767, 343/769, 770
See application file for complete search history.

(56) References Cited

U.S. PATENT DOCUMENTS

| | | | | |
|---|---|---|---|---|
| 6,263,193 B1 * | 7/2001 | Iseki et al. | ...................... | 455/84 |
| 6,329,950 B1 * | 12/2001 | Harrell et al. | .......... | 343/700 MS |
| 6,509,880 B2 * | 1/2003 | Sabet et al. | ................... | 343/770 |
| 6,806,842 B2 * | 10/2004 | King et al. | ..................... | 343/795 |
| 7,948,379 B2 * | 5/2011 | Miyake et al. | ............. | 340/572.1 |
| 2003/0020663 A1 * | 1/2003 | Bolzer et al. | ................. | 343/770 |
| 2004/0036657 A1 | 2/2004 | Forster et al. | | |
| 2004/0052203 A1 * | 3/2004 | Brollier | ........................ | 369/273 |
| 2004/0090379 A1 * | 5/2004 | Fourdeux et al. | ...... | 343/700 MS |
| 2005/0276210 A1 * | 12/2005 | Reiter et al. | ............... | 369/272.1 |
| 2006/0028344 A1 * | 2/2006 | Forster | ...................... | 340/572.7 |
| 2006/0250250 A1 * | 11/2006 | Youn | ......................... | 340/572.7 |

FOREIGN PATENT DOCUMENTS

EP    1598815    11/2005
WO    WO 03/092173    11/2003

OTHER PUBLICATIONS

Search Report Dated Nov. 19, 2007.

* cited by examiner

*Primary Examiner* — Jennifer Mehmood
*Assistant Examiner* — Andrew Bee
(74) *Attorney, Agent, or Firm* — Tutunjian & Bitetto, P.C.

(57)    ABSTRACT

The present invention relates to a method for integrating an identifier circuit in a data medium formed by at least one dielectric substrate covered by a conductive layer, the conductive layer comprising a part receiving data and a part without data. The method consists in etching in the part without data of the conductive layer, at least one resonating slot forming an antenna and coupling an integrated circuit to the slot.

9 Claims, 4 Drawing Sheets

(a) Real part (b) Imaginary part

METHOD OF INTEGRATING AN IDENTIFICATION CIRCUIT INTO A DATA MEDIUM

This application claims the benefit, under 35 U.S.C. §365 of International Application PCT/FR2007/051431, filed Jun. 13, 2007, which was published in accordance with PCT Article 21(2) on Jan. 3, 2008 in French and which claims the benefit of French patent application No. 0605830, filed Jun. 28, 2006.

The present invention relates to an improvement for data media, such as optical media. It relates more particularly to a method of fabrication of an optical data media enabling the integration of an electronic chip or "tag", more specifically a tag operating at an RF frequency, inside the media.

The remote identification or radio frequencies use technique, known in Europe under the term "RFID Technique" or in the United States under the term "RF Technique", enables the identification and, more generally, the remote scanning of information included in an integrated circuit or tag by means of an interrogative system using radio-frequency waves known as RFID reader. The integrated circuit is in the form of a tag linked to a transmission/reception antenna generally known under the term "RFID tag" and attached to an object.

In a known manner, the RFID tag is activated when it enters the field generated by the "RFID reader" with which it is associated and sends back the requested information stored in the tag. The RFID tags can be passive or active. The active tags are powered by an independent energy source such as a battery while the passive tags receive energy from the radio-frequency signal received by the tag.

The RFID technique can be used in a large number of applications from labelling to product authentication to high-tech logistics. Hence, for optical disks such as compact disks (CD) or digital versatile disks (DVD), the use of a RFID tag could be useful to resist against illegal copying and against theft in shops. In this case, it is of interest that the tag is integrated into the structure of the optical disk and not simply attached, for example on the cover containing the disk.

The integration of an RFID tag in the structure of an optical disk has already been proposed. Hence, the realisation of a dipole type antenna was proposed using a printing technique with a conductive ink. However, these dipole type antennas suffer from a low level of efficiency linked in part to conductive ink losses and to the very close proximity of the dipole type antenna with the layer that is reflective but also conductive that is an intrinsic part of the structure of the optical disk. This solution type is shown in FIG. 1. In this figure, reference 1 represents the reflective layer of a CD in aluminium. Reference 2 represents the CD edge constituted of a dielectric substrate, notably in polycarbonate. Reference 3 represents the dipole type antenna obtained by printing a line on the edge of the optical disk realised using a conductive ink. Reference 4 represents the power supply of the antenna connected to a RFID tag. Reference 5 represents the disk central aperture enabling it to be driven inside a player.

The simulations performed on an antenna of this type show that the effect due to the proximity of the antenna with respect to the conductive layer is important even when the dipole type antenna is printed on the external edge of the disk, on a part with no metallization. In fact, in this case, the current induced by the dipole on the conductive layer is found to be almost in phase opposition with the current in the dipole and has the effect of destroying the radiation pattern. Moreover, the use of a dipole type antenna as radiating element does not enable the best possible and simple impedance matching of the antenna to the tag.

Another solution type has been proposed, notably in the patent application US 2005/276210 A1. In this case, the antenna is constituted by one or more conductive rings realised by a conductive layer of the structure of the optical disk that can be a CD or a DVD, these rings being coupled to the tag. To realise these conductive rings or ring arcs and/or couple them to the tag, areas of the conductive layer are demetallized. This solution uses the conductive layer as an antenna, notably the aluminium layer that is part of the structure of a CD or DVD.

However it presents a certain number of disadvantages, notably a limited number of resonances imposed by the standard dimensions of the optical disk and of the conductive ring. In fact it is possible to energize the conductive disk in the manner of an imbalanced monopole. The ground plane of this monopole is etched on a part of the perimeter of the optical disk. Simulations have shown that such an excitation generates a resonance frequency outside of the desired frequency band. It is then impossible to change this resonance frequency, this being imposed mainly by the disk size. On the one hand, the demetallization of parts of the conductive layer that in fact contains information recorded in the optical disk and on the other hand, a very weak impedance control presented by the antenna, limits the RFID system performances and in particular its range that is highly dependant on the quality of coupling of the antenna to the tag.

The present invention therefore proposes a new solution for the integration of a radio-frequency chip or tag into the structure of an optical disk or similar device enabling the disadvantages of solutions of the prior art to be overcome.

The present invention relates more particularly to a method for the realisation of the antenna structure inside the data medium and its coupling to the integrated circuit or tag.

The present invention therefore relates to a method for integrating an identification circuit in a data medium formed by at least one dielectric substrate covered by a conductive layer, the conductive layer comprising a part receiving data and a part without data characterized in that it consists in:
  etching in the part without data of the conductive layer, at least one radiating slot forming an antenna and
  coupling an integrated circuit to the slot.

According to another characteristic of the present invention, the conductive layer is etched on a length L such that $L=\lambda g/2$ where $\lambda g$ is equal to the wavelength in the slot at the resonating frequency. $\lambda g$ being a function of the effective permittivity of the slot, this value depending on the permittivity of the material, on its thickness as well as on the slot width. It is therefore possible to modify the resonating frequency by adjusting the length and width of the slot.

According to another characteristic of the present invention, at least two concentric resonating slots electromagnetically coupled together are etched in the part without data of the conductive layer.

According to another characteristic of the present invention, at least two partially overlapping resonating slots are etched in the part without data of the conductive layer.

According to a preferential embodiment of the present invention, the integrated circuit is electromagnetically coupled to the resonating slot. However the integrated circuit can be coupled by direct connection to the slot.

To obtain a maximum coupling, the integrated circuit is positioned on the resonating slot at a length L' with respect to one end of the resonating slot, in a manner to optimise the impedance of the resonating slot.

The data medium is an optical disk such as a compact disk (CD), a digital versatile disk (DVD), a mini-disk or similar device.

The integrated circuit or tag is a RFID circuit or a RF circuit.

Other characteristics and advantages of the present invention will emerge upon reading the following description made with reference to the annexed drawings, wherein:

FIG. 1 already described is a schematic view from above of an optical disk equipped with a RFID tag according to an embodiment of the prior art.

A description will first be given with reference to FIGS. 2 to 6, of a first embodiment of the present invention. This description will be made referring to a data medium constituted by an optical data medium such as a compact disk (CD). However, it is evident to those in the profession that the present invention can be applied to other data media, notably to digital versatile disks (DVD), mini-disks or similar devices. The structure of a compact disk or CD is well known to those in the profession and will not be described in a very detailed manner. It is constituted by a stack of at least one dielectric layer, more specifically a layer of polycarbonate, in which are etched "pits" representing data. This layer is covered with a reflecting layer, more specifically an aluminium layer, the latter being covered by a dielectric material most often an anti-UV acrylic lacquer creating a protective film for the data.

Figure 1:
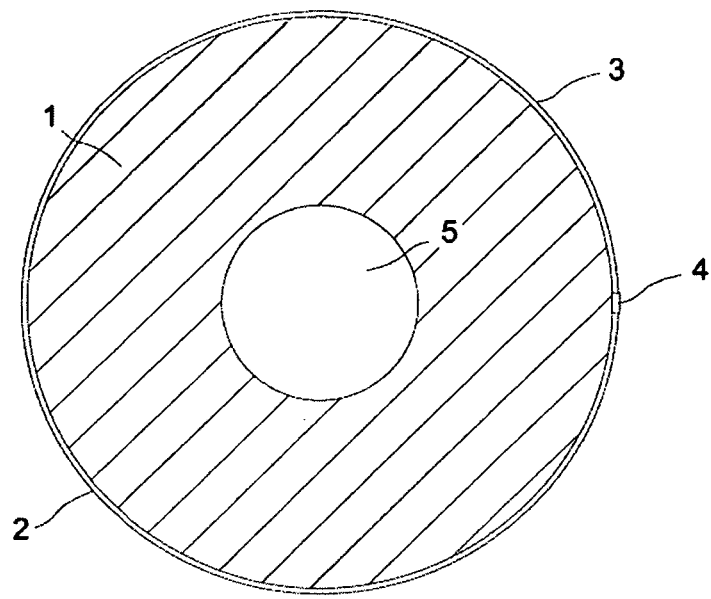
Figure 2:
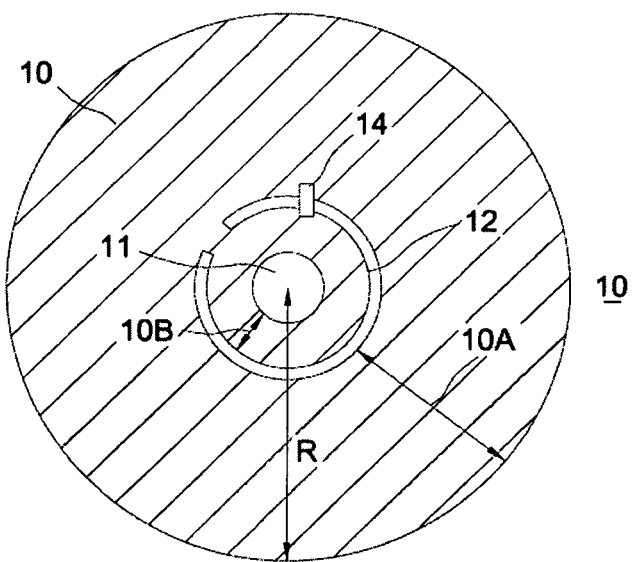
FIG. 2 is a schematic view from above of an optical disk equipped with a RFID tag according to an embodiment of the present invention.

As shown in FIG. 2, a compact disk has the form of an aluminium ring 10 that, in the scope of the present invention, comprises a first ring 10a receiving data and a second ring 10b that is a part without data. In the embodiment shown, the part without data is found at the level of the internal ring. However, one can envisage, without leaving the scope of the invention, the realisation of this part without data at the level of the external ring. In addition, the disk comprises a central aperture 11 enabling its mounting on the rotation axis of a player.

Figure 3:
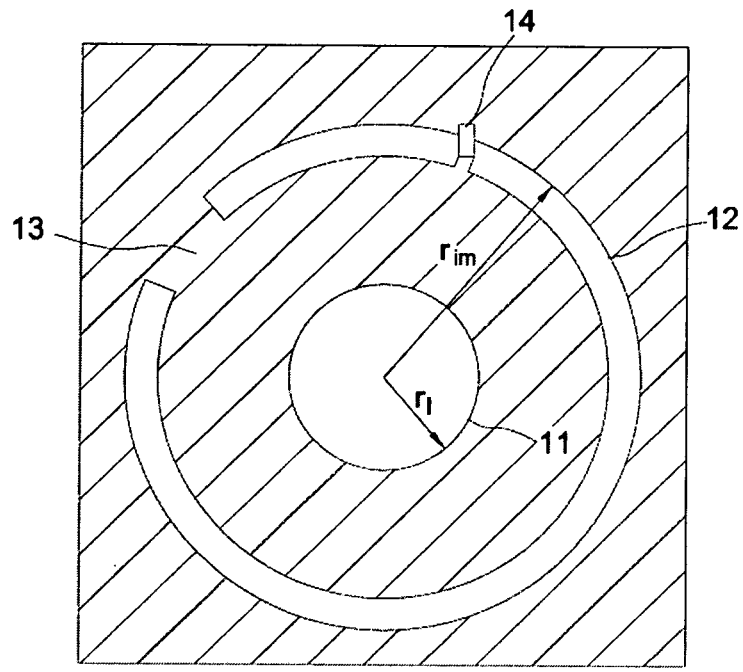
FIG. 3 is an enlarged view of the part of the optical disk receiving the RFID tag.
Figure 4:
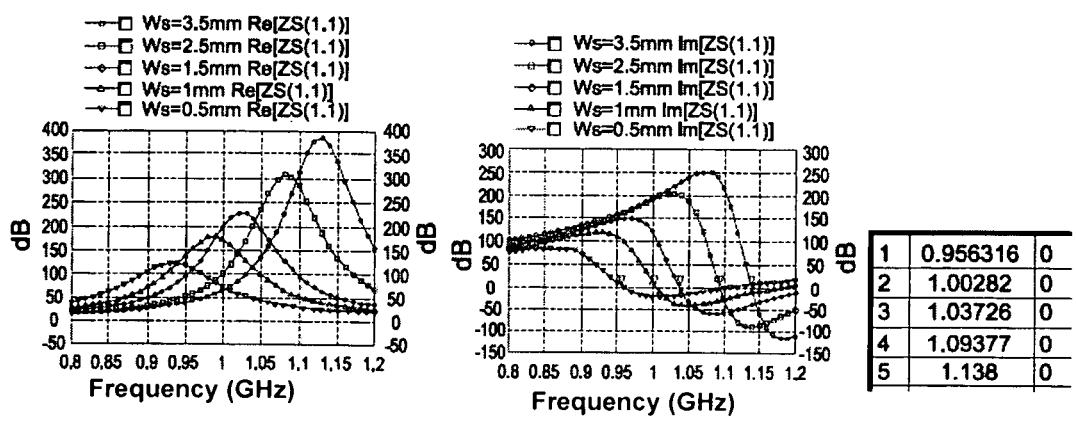
FIG. 4 shows, for a given slot length, respectively the real part and the imaginary part of the impedance frequency responses for several slot widths.
Figure 5:
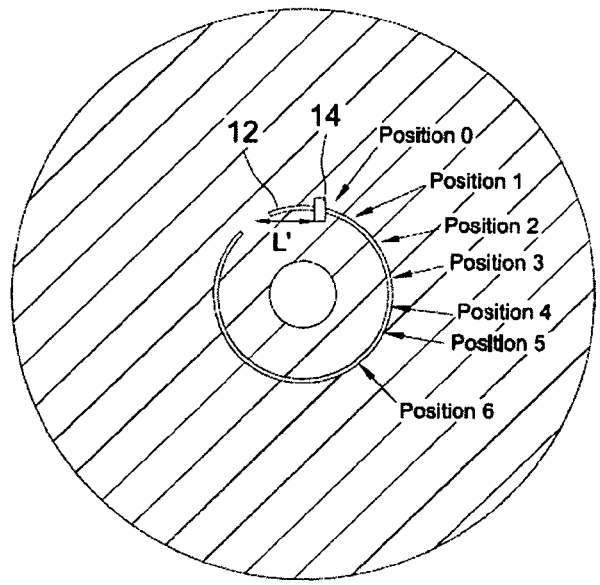
FIG. 5 is a schematic view from above of an optical disk equipped with an RFID tag according to the present invention, showing different positions for the integrated circuit.

As shown in FIG. 3 which is an enlarged view of the central part of the disk of FIG. 2, the central aperture 11 presents a radius $r_i$. This radius $r_i$ determines the internal perimeter of the ring without data that extends as far as a circle with a radius $r_{im}$ such that the ring of the part without data extends over a width equal to $r_{im}$-$r_i$.

In accordance with the present invention and as shown in FIGS. 2 and 3, a slot 12 was etched in the area without data with a length L less than the perimeter determined by the radius $r_{im}$. The length 13 in the area without data extending in the slot 12 is a metallized area. The slot 12 is dimensioned to realize a radiating slot and its length L is calculated so that, at the operating frequency, L=$\lambda g/2$ where $\lambda g$ is equal to the wavelength in the slot, preferably $\lambda g$=$\lambda 0/\sqrt{\in eff}$ where $\lambda 0$ is the wavelength in a vacuum with $\lambda 0$=c/f, c being the speed of light and $\in eff$ is the permittivity relative to the slot, this permittivity depending on the permittivity of the material, its thickness but also the width of the slot. Hence, in accordance with the present invention, a radiating antenna is realized in a part of the optical disk without data, preferably a part located close to the rotation centre of the disk. The dimensions of this part without data can be limited by the external perimeter of the radiating antenna.

As shown in FIGS. 2 and 3, the slot 12 is supplied at a point 14. In this case, the power supply of the slot is by electromagnetic coupling placing the chip or RFID tag 14 in parallel on the slot. According to another embodiment, the RFID tag, instead of being linked by an electromagnetic coupling to the resonating slot 12, can be connected directly to the slot. As described later, the connection point is chosen in a manner to correspond to the impedance point of the slot that ensures the best energy transmission from the antenna to the tag and vice versa.

A CD equipped with a resonating slot type antenna as shown in the FIGS. 2 and 3, was simulated using commercial electromagnetic software (IE3D from Zeland). The following parameters were used for the simulation. The optical disk is constituted by a polycarbonate substrate with a thickness of 0.6 mm, a permittivity ($\in r$) of 2.8 and tan $\Delta$1e−4. The polycarbonate substrate is covered by an aluminium layer with a conductivity of 38,000,000 Siemens/m and a thickness of 50 nm. The internal radius $r_i$ of the metallic disk is 7.5 mm while the external radius R of the disk is 60 mm. On this disk and in accordance with the present invention, a resonating slot 12 was etched in the aluminium layer. This slot 12 has a length L equal to 115 mm to obtain a resonance of around 950 MHz. This slot falls within the circle of the radius $r_{im}$ less than or equal to 20 mm.

With the disk as described above, the impedance frequency responses (real and imaginary parts) of the slot for several slot widths varying between 0.5 mm and 3.5 mm were first simulated. The simulation results are provided in FIG. 4. In fact, the adjustment of the slot width enables adjustment of the antenna impedance. However, a modification of the slot width leads to a modification of the resonance frequency, as this impacts the applications given above, it is therefore possible to modify the resonance frequency by adjusting the length of the slot. According to the charge presented by the RFID tag and using FIG. 4, it is then possible to choose the slot length enabling conjugated impedance of the RFID tag, to best adapt the antenna to the RFID circuit. The slot width is therefore one of the means for antenna impedance control to present to the RFID tag, and this for an excitation position of the given slot.

Moreover, as mentioned above, the RFID tag is coupled in parallel to the resonating slot 12. To obtain the best possible coupling, this must be at a length L' from one end of the slot selected in a manner to optimise the coupling. To determine this optimal position, different positions were simulated using the software mentioned above, this simulation being necessary to determine the optimum position because the slot does not have a rectilinear form.

Figure 6:
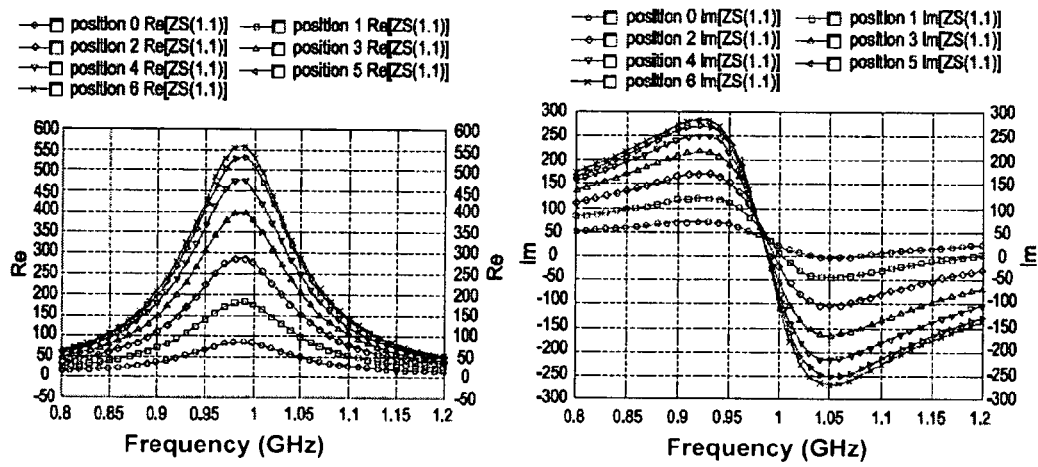
FIG. 6 shows the curves giving the real and imaginary parts impedance frequency responses for different positions given in FIG. 5.

The simulation results are provided in FIG. 6, that shows the impedance frequency responses (real and imaginary parts) for the different positions 0 to 6 of the tag. The results obtained show that a maximum coupling is obtained for the 0 position. A similar reasoning to that formulated for the choice of slot width can also be made here.

Other embodiments of the present invention will now be described with reference to FIGS. 7 to 8.

Figure 7:
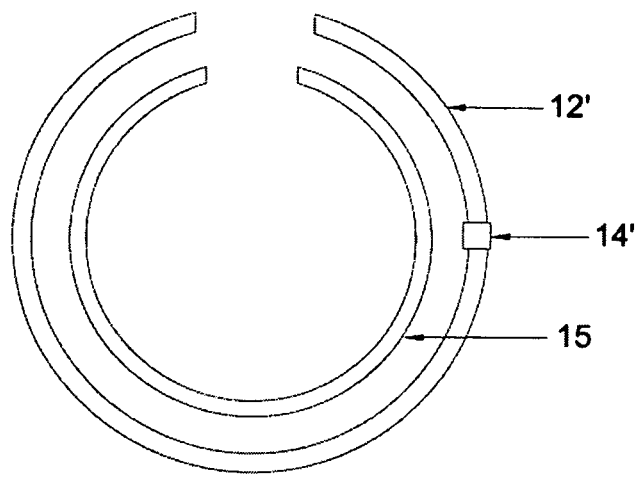
FIG. 7 and FIG. 8 are schematic representations of other embodiments in accordance with the present invention.

In FIG. 7, a first resonating slot 12' realizing an antenna in accordance with the present invention is shown schematically. On this slot 12' an RFID tag or chip 14' is mounted in parallel, this tag being electromagnetically coupled to the resonating slot 12'. In this embodiment, a second slot 15 is realized between the central aperture and the slot 12'. This slot 15 is a resonating slot that can be electromagnetically coupled to slot 12'. The second slot 15 is dimensioned to resonate at another frequency, which enables an operation to be obtained on several frequencies.

Figure 8:
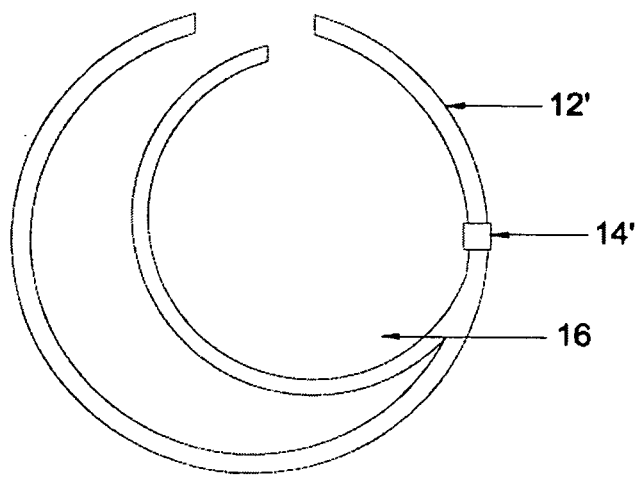

In FIG. 8, yet another embodiment of the present invention is shown. In this case, a second slot 16 partially overlays the first slot 12' and develops inside the resonating slot 12'. This slot 16 enables a certain flexibility of impedance matching of the chip or RFID tag 14', over several frequency bands.

It is evident to those in the profession that the number of annular slots that can be added by proximity coupling to the main slot linked directly to the chip or RFID tag is unlimited.

The present invention was described with reference to an optical disk such as a compact disk. However it is evident to those in the profession that it can be applied to other types of data media realized with materials other than polycarbonate and aluminium provided that the substrate is a dielectric covered with a metallization.

The invention claimed is:

1. Method for integrating an identification circuit in a data medium formed by at least one dielectric substrate covered by a conductive layer, the conductive layer having a part receiving data and a part without data, the method comprising the steps of:
    etching in the part without data of the conductive layer on a first length L less than a perimeter of said part without data, at least a radiating slot forming an antenna, said first length L determining a resonating frequency, and
    coupling an integrated circuit to the radiating slot and positioning said integrated circuit on said radiating slot, at a second length L' from an end of said first length L, said second length L' being selected to optimize an impedance of the radiating slot.

2. Method according to claim 1, wherein the first length L is such that $L=\lambda g/2$ where $\lambda g$ is equal to the wavelength in the slot at a resonating frequency.

3. Method according to claim 1, wherein at least two concentric resonating slots electromagnetically coupled together are etched in the part without data of the conductive layer.

4. Method according to claim 1, wherein at least two partially overlying resonating slots are etched in the part without data of the conductive layer.

5. Method according to claim 1, wherein the integrated circuit is electromagnetically coupled to the radiating slot.

6. Method according to claim 1, wherein the integrated circuit is connected directly to the radiating slot.

7. Method according to claim 1, wherein the data medium is a disk such as a compact disk (CD), a digital versatile disk (DVD), or a mini-disk.

8. Method according to claim 1, wherein the integrated circuit is a RFID circuit or a RF circuit.

9. A data medium formed by at least one dielectric substrate covered by a conductive layer, the conductive layer having a part receiving data and a part without data;
    wherein the part without data of the conductive layer comprises etching on a first length L less than a perimeter of said part without data, at least a radiating slot forming an antenna, said first length L determining a resonating frequency; and
    an integrated circuit coupled to said radiating slot and positioned on said radiating slot at a second length L' from an end of said first length L, said second length L' being selected to optimize an impedance of the radiating slot.

* * * * *